(12) United States Patent
Toono

(10) Patent No.: US 7,174,182 B2
(45) Date of Patent: Feb. 6, 2007

(54) TRANSMITTING ELECTRIC POWER CONTROL METHOD IN THE CDMA SYSTEM

(75) Inventor: Kousuke Toono, Tokyo (JP)

(73) Assignee: NEC Corporation, Tokyo (JP)

(*) Notice: Subject to any disclaimer, the term of this patent is extended or adjusted under 35 U.S.C. 154(b) by 438 days.

(21) Appl. No.: 10/419,871

(22) Filed: Apr. 22, 2003

(65) Prior Publication Data
US 2004/0038699 A1 Feb. 26, 2004

(30) Foreign Application Priority Data
Apr. 23, 2002 (JP) .............................. 2002/120752

(51) Int. Cl.
*H04B 7/00* (2006.01)
(52) U.S. Cl. ...................... 455/522; 455/67.13; 455/69
(58) Field of Classification Search ................ 455/522, 455/69, 504, 67.13
See application file for complete search history.

(56) References Cited

U.S. PATENT DOCUMENTS

| | | | | |
|---|---|---|---|---|
| 5,794,129 A * | 8/1998 | Komatsu | ...................... | 455/69 |
| 5,924,043 A * | 7/1999 | Takano | ...................... | 455/522 |
| 6,034,952 A * | 3/2000 | Dohi et al. | .................. | 370/335 |
| 6,035,210 A * | 3/2000 | Endo et al. | .................. | 455/522 |
| 6,249,682 B1 | 6/2001 | Kubo et al. | | |
| 6,285,887 B1 * | 9/2001 | Mimura | ...................... | 455/522 |
| 6,341,224 B1 * | 1/2002 | Dohi et al. | .................. | 455/522 |
| 6,490,461 B1 * | 12/2002 | Muller | ...................... | 455/522 |
| 6,735,447 B1 * | 5/2004 | Muller | ...................... | 455/522 |
| 6,999,427 B1 * | 2/2006 | Usuda et al. | ............... | 370/318 |
| 2001/0012766 A1 * | 8/2001 | Ichikawa | ...................... | 455/69 |
| 2002/0115465 A1 * | 8/2002 | Komatsu | ...................... | 455/522 |

FOREIGN PATENT DOCUMENTS

| | | |
|---|---|---|
| JP | 9-284205 | 10/1997 |
| JP | 2001-77724 A * | 3/2001 |
| WO | WO 97/50197 | 12/1997 |
| WO | WO 00/48336 | 8/2000 |

* cited by examiner

*Primary Examiner*—Matthew D. Anderson
*Assistant Examiner*—Philip J. Sobutka
(74) *Attorney, Agent, or Firm*—Dickstein Shapiro LLP

(57) ABSTRACT

An electric power control method is provided. In the method, a range having a maximum value, which is an output ratio of initial target signal to disturbance wave added with an offset addition value, and a minimum value, which is the output ratio of initial target signal to disturbance wave subtracted an offset subtraction value, is set. If an output ratio of target signal to disturbance wave is equal to or more than the maximum, the output ratio of target signal to disturbance wave is set to the maximum, if an output ratio of target signal to disturbance wave is equal to or less than the minimum, the output ratio of target signal to disturbance wave is set to the minimum, and if an output ratio of target signal to disturbance wave is within the range, no adjustment is performed.

8 Claims, 14 Drawing Sheets

TRANSMITTING ELECTRIC POWER CONTROL METHOD IN THE CDMA SYSTEM

BACKGROUND OF THE INVENTION

1. Field of the Invention

This invention relates to a CDMA system cellular phone device and a transmitting electric power control method of outer loop downlink electric power control in packet communications.

2. Related Art of the Invention

In the view of effective use of frequency band and secrecy of communication contents, code division multiple access (CDMA) systems are beginning to be employed instead of frequency division multiple access (FDMA) and time division multiple access (TDMA), which have been conventionally used in cellular phone devices as a multiple access system. The code division multiple access with diffusion code (hereafter, referred as a CDMA system) is employed in W-CDMA and cdma2000, which are specifications for the third generation cellular phone device.

In the CDMA system, a plurality of communicators share the same frequency band, so that signals of other communicators become an interference signal and communication quality of their channels are degraded. If a mobile station near to a base station and another mobile station distant from the base station communicate simultaneously, transmission signals from the nearby mobile station are received by the base station at a high electric power and ones from the long-distance mobile station are received at a low electric power. Therefore, a near/far problem, in which transmission signals from the long-distance mobile station are buried in ones from the nearby mobile station. This problem may occur at not only base stations but also mobile stations.

In order to solve the near/far problem, transmitting electric power control to adjust transmitting electric power from mobile and base stations is indispensable. For example, in re-released patent WO97/50197, in order to reduce the output from a mobile station near to a base station, an electric power ratio of receiving signal to disturbance wave for a desired wave is measured at a base station, and an output ratio of target signal to disturbance wave(target SIR), which is acquired from a block error rate, is compared with the output ratio of receiving signal to disturbance wave(received SIR) to determine electric power increase or decrease. Then, a transmitting frame of signals from the base station to a mobile station, in which a transmitting electric power control bit is defined, is transmitted, enabling to increase or decrease electric power.

The above-described re-released patent remains problems that interference electric power accuracy falls if the output ratio of receiving signal to disturbance wave for a desired wave is small, resulting that the accuracy of electric power control itself also falls. To solve the problem, an invention, in which the accuracy of interference electric power measurement is not lowered even if an output ratio of receiving signal to disturbance wave is small, by using an interpolation synchronous detection method in a measurement equipment for output ratio of receiving signal to disturbance wave with a known pilot signal in a transmission frame, is released in Japanese Patent Laid-Open No. 9-284205.

In addition, there are the following problems resulted from that the time when downlink packet data does not exist continues in packet communications on a dedicated channel in transmitting electric power control at a base station in the CDMA system.

When packet data does not exist, a block error rate (BLER) cannot be measured. Therefore, it is the first problem that output adjustment using an outer loop cannot be performed. While there is no packet data, a CRC (cyclic redundancy check) bit, which is used for error detection, is turned off to transmit dummy data, so that CRC processing is not performed. As a result, the measurement of a block error rate and receiving quality control based on it cannot be performed. This is because the last output ratio of target signal to disturbance wave when a downlink packet exists is constantly maintained.

The second problem is that some time is required to adjust an output ratio of target signal to disturbance wave if downlink packet data re-occurs. If downlink packet data re-occurs after a state without packet continues, a block error rate cannot be determined until sufficient packets are received to determine it. This is because a long time is required to modify an output ratio of target signal to disturbance wave if a big change occurs in a surrounding environment during detection of a block error rate.

The third problem is that resources of a base station are wasted despite a state without downlink packet data. The reason is that a spike noise occurs if only pilot signals are transmitted, so that dummy data continues being transmitted to prevent it from occurring.

In addition, there is also a method to reset the output ratio of target signal to disturbance wave to an initial value immediately or after a fixed time passes after receiving packet data does not exist. However, receiving electric power at a mobile station is frequently increased or decreased when receiving intermittent packet data, so that transmitting electric power control at a base station cannot be performed with stability.

SUMMARY OF THE INVENTION

To solve the above-described problems, in this invention, transmitting electric power is compulsorily lowered to prevent the occurrence of a near/far problem if the time when packet data does not exist passes more than a fixed time and transmitting electric power from a terminal device to a base station exceeds a fixed range. On the other hand, if transmitting electric power from a terminal device to a base station is not more than a fixed range, transmitting electric power is increased at beginning of transmitting and receiving packet data so as to increase its durability over surrounding electric waves. The purpose of this invention is to constantly keep data communication quality between terminals and base stations in data communications using the above-described methods.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Hereinafter, embodiments of this invention will be explained in detail with reference to drawings.

Figure 1:
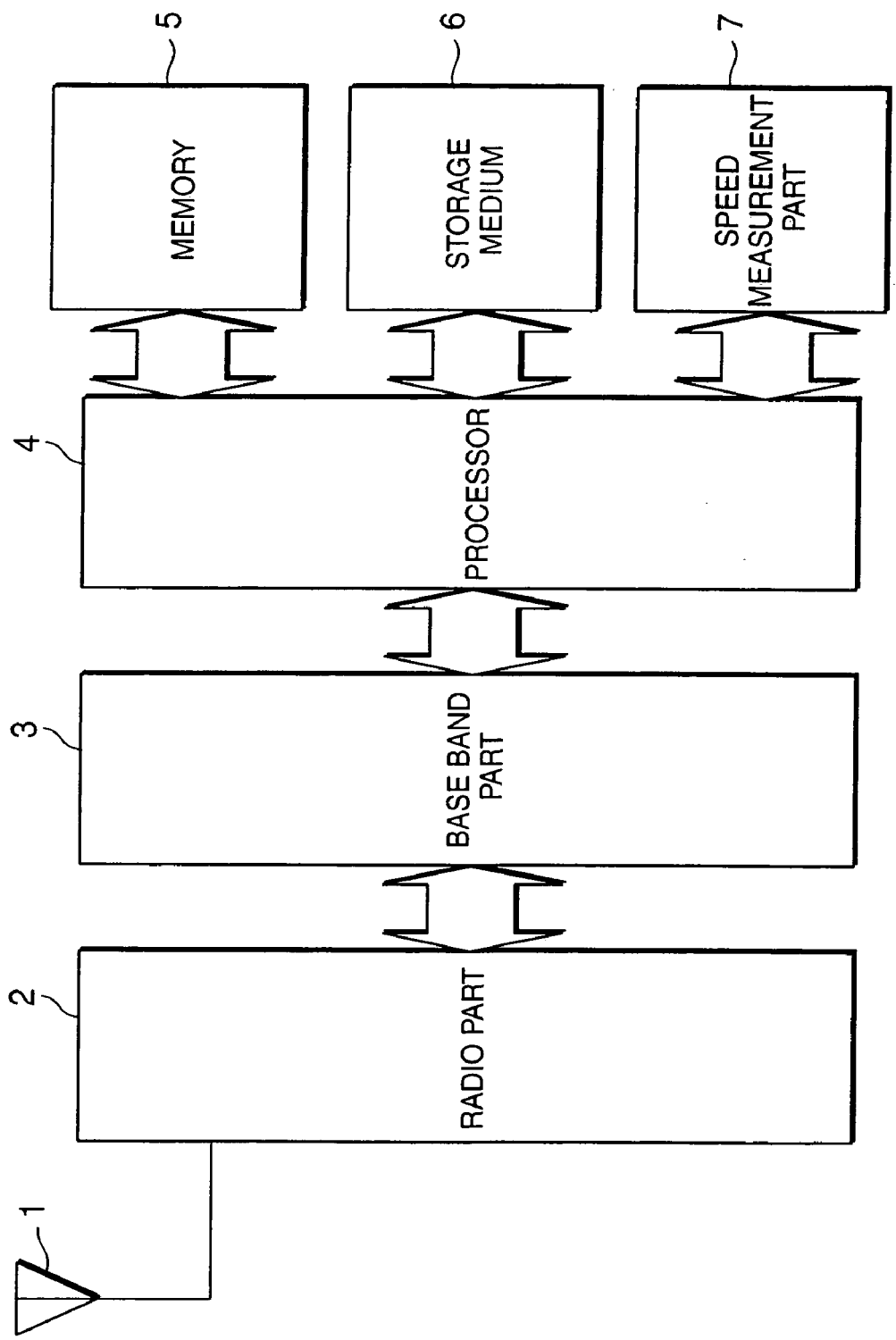
FIG. 1 is a block diagram to show a first embodiment of a mobile radio device according to this invention.

FIG. 1 is a block diagram to show a first embodiment of a mobile radio device according to this invention. Hereinafter, a CDMA cellular phone device, with which a CDMA system is employed, will be used as a mobile radio device.

A CDMA cellular phone device shown in FIG. 1 is composed of an antenna 1, a radio part 2, a base band part 3, a processor 4, memory 5, a storage device 6 and a speed measurement part 7.

The radio part 2 has a modulation/demodulation circuit, which modulates and demodulates radio signals transmitted and received through the antenna 1.

The base band part 3 includes an encoder, which performs error correction encoding for data transmitted from the processor 4, a circuit, which divides into radio frames, and a circuit, which performs orthogonal code diffusion. In addition, the base band part 3 also includes a circuit, which performs orthogonal code reverse diffusion for received data demodulated at the radio part 2, a circuit, which measures power, a circuit, which multiplexes radio frames, and a decoder, which performs error correction decoding. Furthermore, the base band part 3 includes a circuit related to electric power control according to this invention. In this circuit, base station transmitting power control is performed by comparing an output ratio of receiving signal to disturbance wave (hereafter, called as receiving SIR), which is calculated by the processor 4 (described later) using the result of power measurement of received data, with an output ratio of target signal to disturbance wave (hereafter, called as target SIR), which is determined by the processor 4, generating a transmitting power control bit for the base station transmitting electric power control, and mapping it onto a physical cannel to transmit via the radio part 2.

The processor 4 executes programs stored in the storage device 6 and controls all parts in the block.

The memory 5 stores information transmitted from the processor 4. Dynamic RAM is used for the memory 5.

In the storage device 6, programs to be executed by the processor 4 are stored. Static or flash ROM and a hard disc may be used for the storage device 6.

The speed measurement part 7 checks speed of a cellular phone device itself. Although there is a method of preparing a speed measurement circuit or pseudly acquiring speed by measuring a Doppler effect at each path of each rake receiver, any method may be employed in this invention if speed can be measured.

Figure 2:
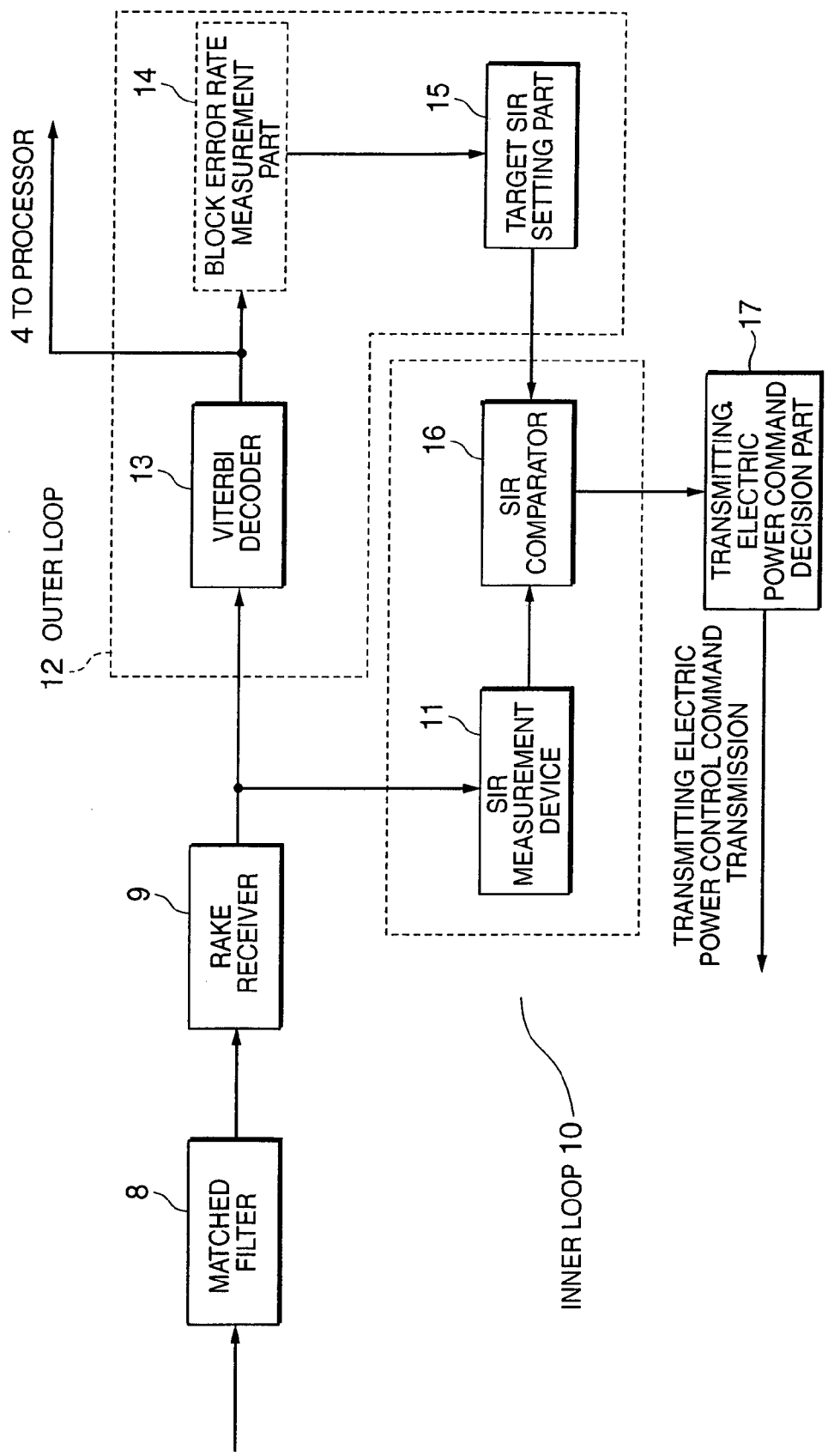
FIG. 2 is a block diagram to show a circuit structure related to electric power control in a base band part shown in FIG. 1.

FIG. 2 is a block diagram to show a basic structure of a circuit related to electric power control in the base band 3. A block error rate measurement part 14 in this figure, however, exists in the processor 4.

A matched filter 8 retrieves desired signal components from received signals. In this circuit, maximization of SIR is aimed rather than retrieving signal waveforms with high fidelity.

A rake receiver 9 searches a path from received signals maximized SIR at the matched filter 8, and assigns a finger receiver, which constitutes the rake receiver 9, to the path. Subsequently, the rake receiver 9 combines outputs of the finger receiver 9 (RAKE composition) to output a high output signal.

After RAKE composition, two processing operations at an inner loop 10 and an outer loop 12 for received signals are performed. In the inner loop 10, receiving SIR of an actually received signal, which is acquired through composition, is measured at a SIR measurement device 11 and determined whether it reaches a predetermined value. On the other hand, in the outer loop 12, a RAKE composite signal is decoded with error correction at a Viterbi decoder 13. Subsequently, a block error rate is verified at the block error rate measurement part 14 in the processor 4. If the block error rate becomes beyond a predetermined value, a temporary target SIR is determined so that transmitting electric power is decreased and set at a target SIR setting part 15. It is a feature for this invention that operations are performed at the outer loop 12 if a block error rate cannot be measured.

The temporary target SIR determined at the outer loop 12 and the state of received SIR at the inner loop 10 are referred at a SIR comparator 16. Based on the result, a transmitting electric power control command determination part 17 determines a transmitting electric power command to be transmitted to a base station.

As described above, at the outer loop 12, a block error rate is measured and temporary target SIR is determined. However, a packet to be transmitted may not exist in a busy state at the upper side during packet communications. In this case, dummy data is transmitted during the state. At this point, normal data does not exist and existence of an error every block or a block error rate cannot be measured. Electric power adjustment at the outer loop is, therefore, not expectable.

This structure is one example and not limited to it. In addition, actually, data after Viterbi decoding is a substantial processing target, but it is omitted in this figure.

FIGS. 3 to 6 are figures to explain the first embodiment of this invention, and operations in the first embodiment will be explained with them.

Figure 3:
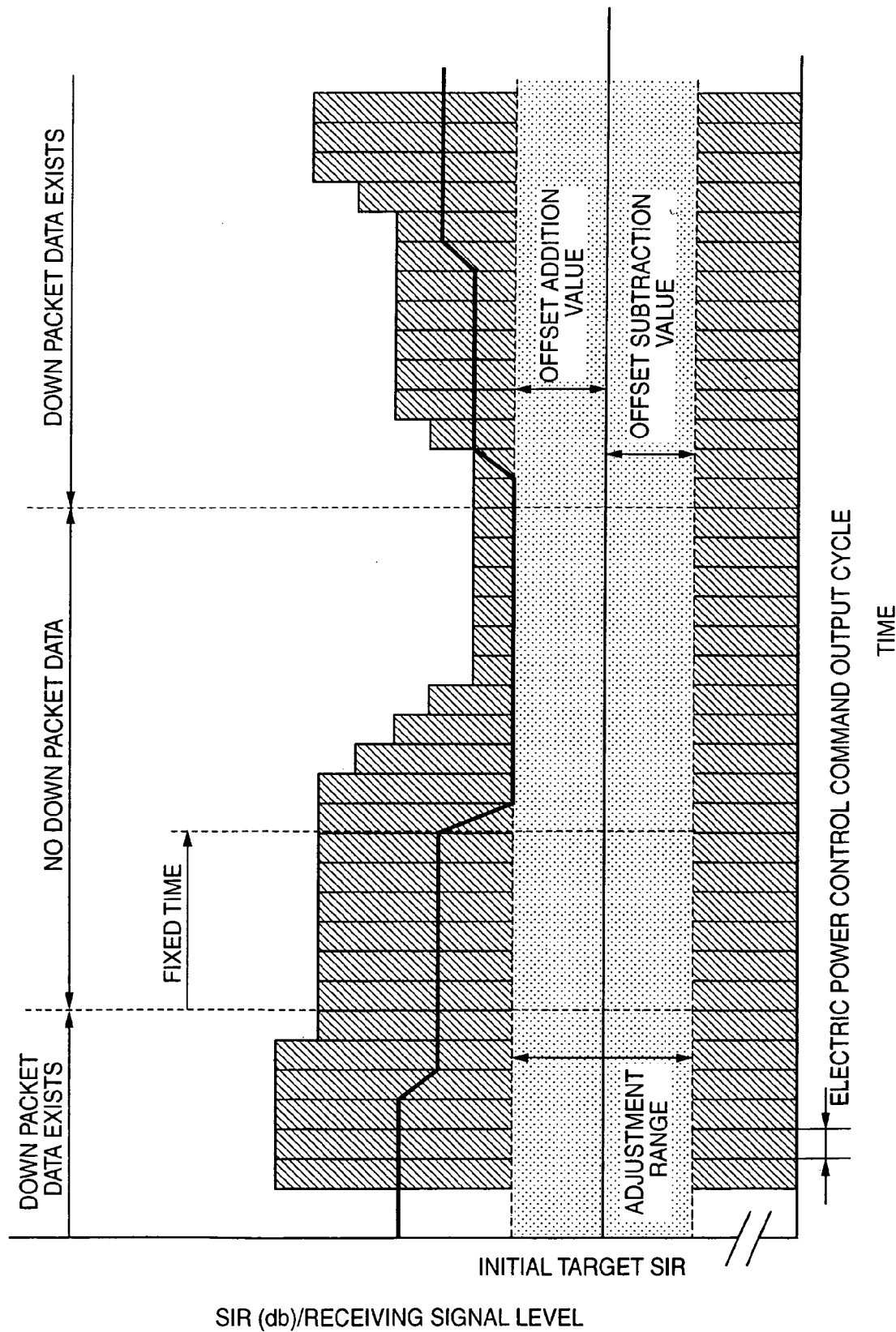
FIG. 3 is a figure to show an operating situation of electric power control in a cellular phone device when an output ratio of target signal to disturbance wave becomes beyond a fixed value in the first embodiment related to the cellular phone device according to this invention.
Figure 4:
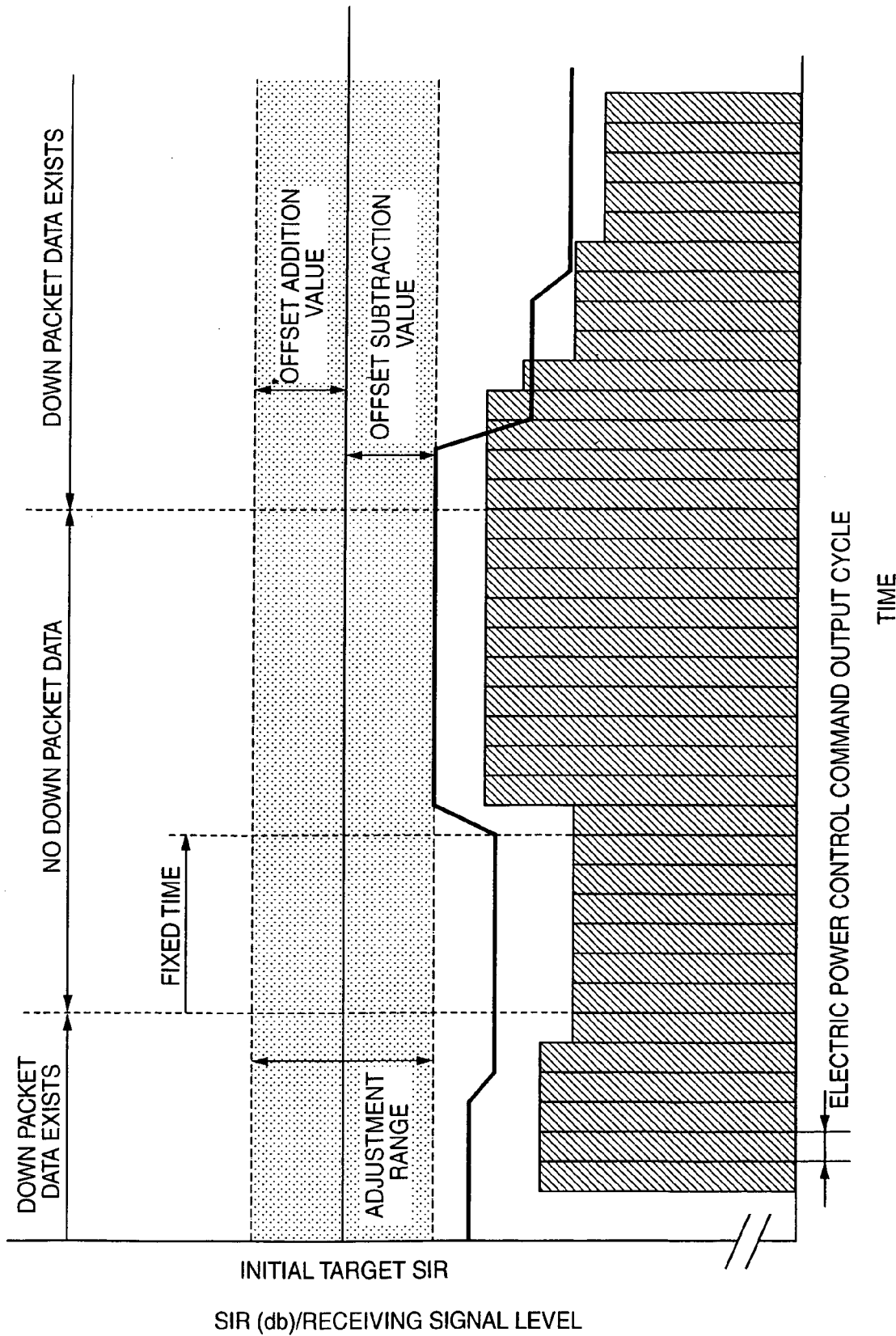
FIG. 4 is a figure to show an operating situation of electric power control in a cellular phone device when an output ratio of target signal to disturbance wave becomes beyond a fixed value in the first embodiment related to the cellular phone device according to this invention.
Figure 5:
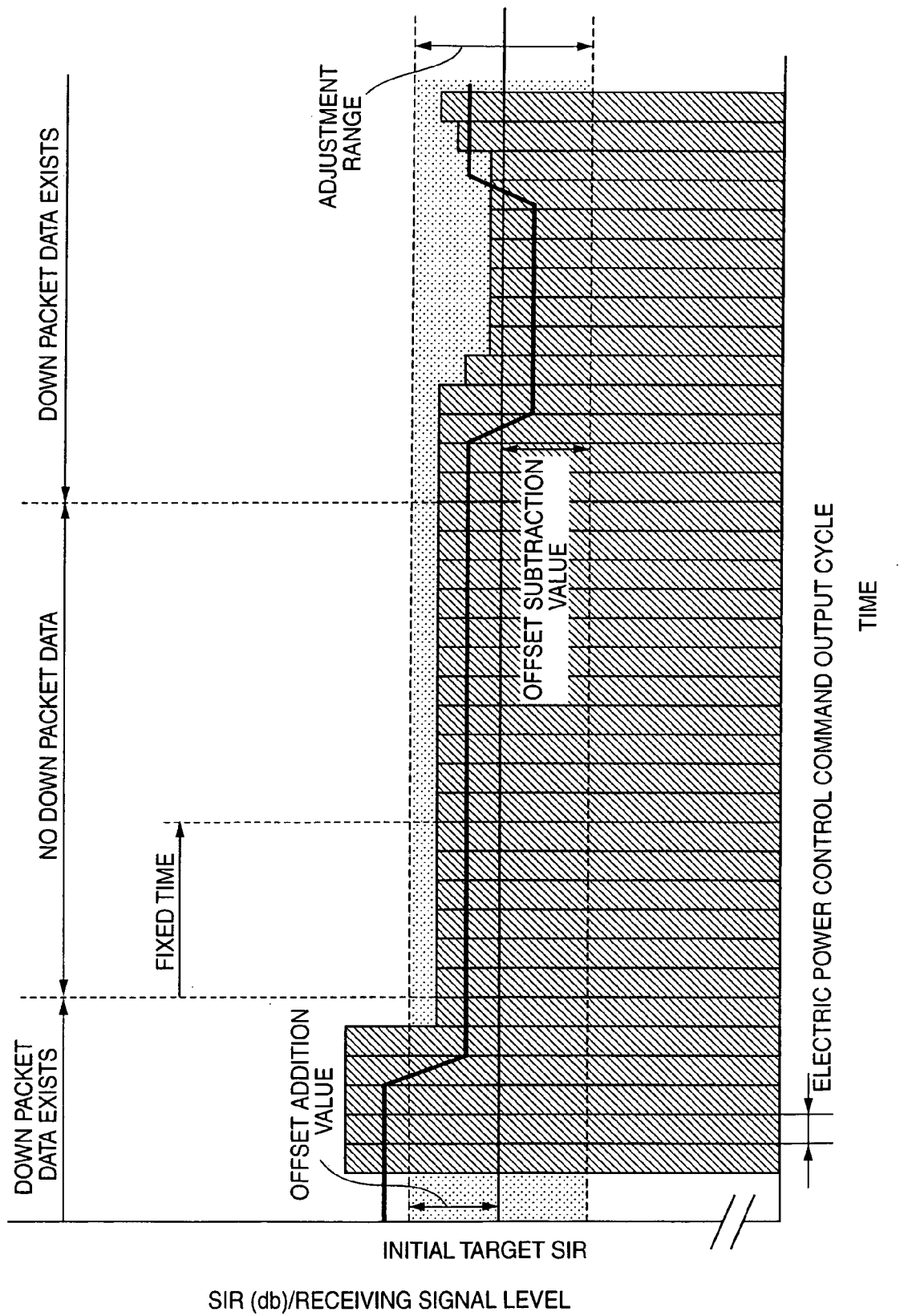
FIG. 5 is a figure to show an operating situation of electric power control in a cellular phone device when an output ratio of target signal to disturbance wave is within a particular range in the first embodiment related to the cellular phone device according to this invention.

FIG. 3 shows operations in the first embodiment of this invention in the case of that a state without any packets during a fixed period occurs depending on circuit situation at a server or other reasons. In this figure, horizontal and vertical axes express time, and target SIR (line graph) and received signal output (bar graph) respectively. The horizontal and vertical axes in FIGS. 4 and 5 are also the same as that of FIG. 3.

Received signal output expresses output of a desired wave signal received by a CDMA cellular phone device. Based on the received signal output, received SIR is derived. Alternatively, if a noise wave is constant, the received SIR is proportional to the received signal output, so that the received SIR itself is not described in this figure.

A CDMA cellular phone device in the first embodiment sets a dedicated channel to a base station (not shown) when calling or receiving. At beginning of communication, downlink electric power control is begun at the base station from an initial value or target SIR (initial target SIR). In FIG. 3, with operations of electric power control, the sate state after increasing the target SIR to a fixed value is shown.

In the CDMA cellular phone device in the first embodiment, electric power control is performed by combining processing operations at the inner loop 10, wherein received SIR is derived and increase of electric power is requested for a base station, and at the outer loop 12, wherein a block error rate of data after Viterbi encoding is acquired and a request of decreasing electric power is outputted if the block error rate becomes beyond a fixed value.

In accordance with combining the inner loop 10 and the outer loop 12, the reason is following. If electric power control is performed by only the inner loop 10, which increases output if received SIR decreases below to a fixed value, all terminal devices which establish a dedicated channel to the same base station reaches the maximum value. It is caused by requests of all terminal devices because received SIR at other terminal devices becomes worsens by the request of output increase from one terminal device. The request of electric power control is transmitted from the transmitting electric power control command determination part 17 to a base station as a TPC command of an up dedicated channel (from a terminal device to the base station) via the radio part 2 to control downlink signal electric power.

If a downlink packet data does not exist during packet communications, dummy data, in which a CRC bit is voided, is transmitted from a base station. Since the transmitted data is dummy, a received block error rate cannot be measured at the block error rate measurement part 14. Therefore, power control to keep receiving quality in packet communications cannot be performed, so that target SIR maintains a fixed value.

As shown in FIG. 3, decoded data is not transferred from the Viterbi decoder 13 to the processor 4 in a state without any downlink packets, and the processor 4 measures this state for a fixed time (fixed time shown in FIG. 3). At this point, if the processor 4 determines that the current value of target SIR is more than the maximum value of an adjustment range (allowable range of SIR) shown in FIG. 3, the processor 4 controls the target SIR setting part 15 to set the target SIR to the maximum value of the adjustment range. As shown in FIG. 3, this allows downlink transmitting electric power at a base station to be decreased and enables to increase available resources of the base station. In addition, it is also useful for reduction of white noise to other mobile stations.

Furthermore, allowing the target SIR setting part 15 to set target SIR to the maximum value of the adjustment range rather than directly setting target SIR to initial target SIR, degradation of receiving block error rate may be reduced when downlink packet data occurs. The maximum value of the adjustment range is the sum of an offset addition value and the initial target SIR. The offset addition value is the optimal value, which is experientially acquired using a simulator. In this case, the offset addition value to acquire the maximum of the adjustment range does not necessarily need to be equal to the offset subtraction value to acquire the minimum. The offset subtraction value may also be experientially acquired. In addition, by measuring current moving speed of a cellular phone device with the speed measurement part 7 in FIG. 1, the offset addition and subtraction values may also be changed. For example, phasing effects increase at a high moving speed, so that the offset addition value is increased. On the other hand, by setting the offset subtraction value to nearly zero, target SIR at a high moving speed may also be set up higher on the whole than that at the time of a stop.

FIG. 4 shows operations in the state that the current value of target SIR is less than the minimum of the adjustment range and a packet does not exist for a fixed time in the first embodiment of this invention. In this case, the processor 4 allows the target SIR setting part 15 to set target SIR to the minimum of the range (target SIR is increased), so that downlink transmitting electric power in the base station side is increased, enabling to prevent unexpected aggravation of BLER. In addition, the optimal value of the offset subtraction value should also be experientially acquired. Since the outer loop 12 is provided to make target SIR decrease, it is possible that the minimum of the adjustment range is not set and processing related to this figure is not performed if a designer determined that it is not desirable to make target SIR increase by employing this control.

FIG. 5 shows operations in the state that the current target SIR is, within the adjustment range and a packet does not exist for a fixed time in the first embodiment of this invention. In this case, in order to reduce change of receiving block error rate when a downlink packet data occurs, the processor 4 does not adjust target SIR.

As described above, a CDMA cellular phone device under packet data communications controls downlink transmitting electric power in the base station side, so that it is possible that available resources at a base station are increased if a downlink packet data does not exist and degradation of receiving block error rate is reduced when a downlink packet data occurs.

Figure 6:
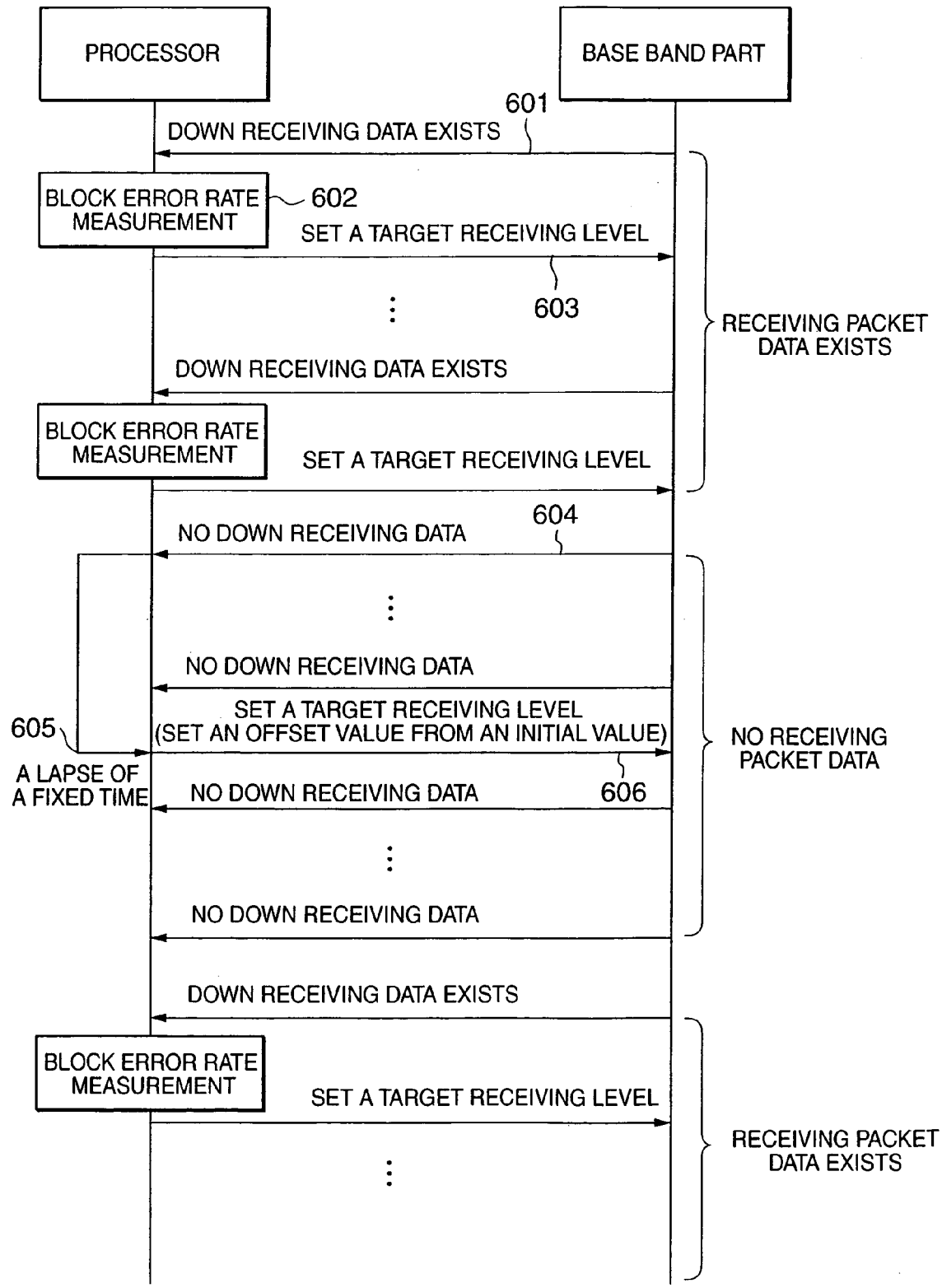
FIG. 6 is a figure to show a processing flow between the processor and the base band part in the first embodiment related to a cellular phone device according to this invention.

FIG. 6 illustrates an operation flow, which is an example of operations between the processor 4 of the CDMA cellular phone device shown in FIG. 1 in the first embodiment and the base band part 3.

The CDMA cellular phone device under packet communications on a dedicated channel processes receiving data from the radio part 2 with orthogonal code reverse diffusion, radio frame combination, and error correction decoding at the base band part 3. Subsequently, the CDMA cellular phone device notifies the block error rate measurement part 14 in the processor 4 of "downlink receiving data exists" and the decoded receiving data (S601).

At the block error rate measurement part 14 in the processor 4, for base station transmitting electric power control (hereafter, called as outer loop control), receiving block error rate is measured, and target SIR is determined with reference to downlink receiving quality (S602). The processor 4 sets the target SIR into the target SIR setting part 15 in the base band part 3 (S603).

The SIR measurement device 11 in the base band part 3 measures a receiving signal level using receiving data from the radio part 2, and derives receiving SIR based on the measured receiving signal level. The SIR comparator 16 compares the acquired receiving SIR with target SIR. With this result, the transmitting electric power control command determination part 17 generates a transmitting power control bit to perform base station transmitting electric power, and maps it onto a physical channel to transmit via the radio part 2.

As a feature of packet communications, downlink data transmission can be stopped if downlink packet data does not exist. Therefore, if downlink packet data does not exist, the Viterbi decoder 13 in the base band part 3 notifies the processor 4 of "no downlink receiving data" (S604). In this invention, if the processor 4 determines that the state of no downlink packet data continues for a fixed time (S605), the processor 4 determines target SIR and defines it for the target SIR setting part 15 in the base band part 3 (S606).

The base band part 3 can perform electric power measurement of receiving by measuring electric power at the control part of a physical channel and base station transmitting electric power control for target SIR. The base band part 3 generates a transmitting power control bit so that receiving electric power is equal to the maximum/minimum of the adjustment range set by the processor 4, and maps it onto a physical channel to perform base station transmitting electric power control.

If downlink packet data occurs from a base station to a terminal device, operations at steps S601 to 603 are repeated to perform the outer loop control by adding the offset addition value to initial target SIR and subtracting the offset subtraction value from initial target SIR.

In the first embodiment, after a fixed time passes after downlink packet data does not exist, the processor 4 sets target SIR to the maximum/minimum value of the adjustment range. However, if a downlink packet data occurs immediately after the fixed time passes, available resources at a base station cannot be fully increased in FIG. 3. In addition, transmitting electric power at a base station has fallen, so that a receiving block error rate is also degraded.

To solve the above-described problem, as a second embodiment, the current target SIR is adjusted with a fixed value whenever a fixed time passes after downlink packet data does not exist. By decreasing target SIR gradually, it is possible to prevent a receiving block error rate from degrading and to increase available resources at a base station even if downlink packet data occurs immediately after a fixed time passes. In addition, by setting a fixed time until target SIR is adjusted shorter than that of the first embodiment, it is also possible to decrease resources at a base station at an early stage.

Figure 7:
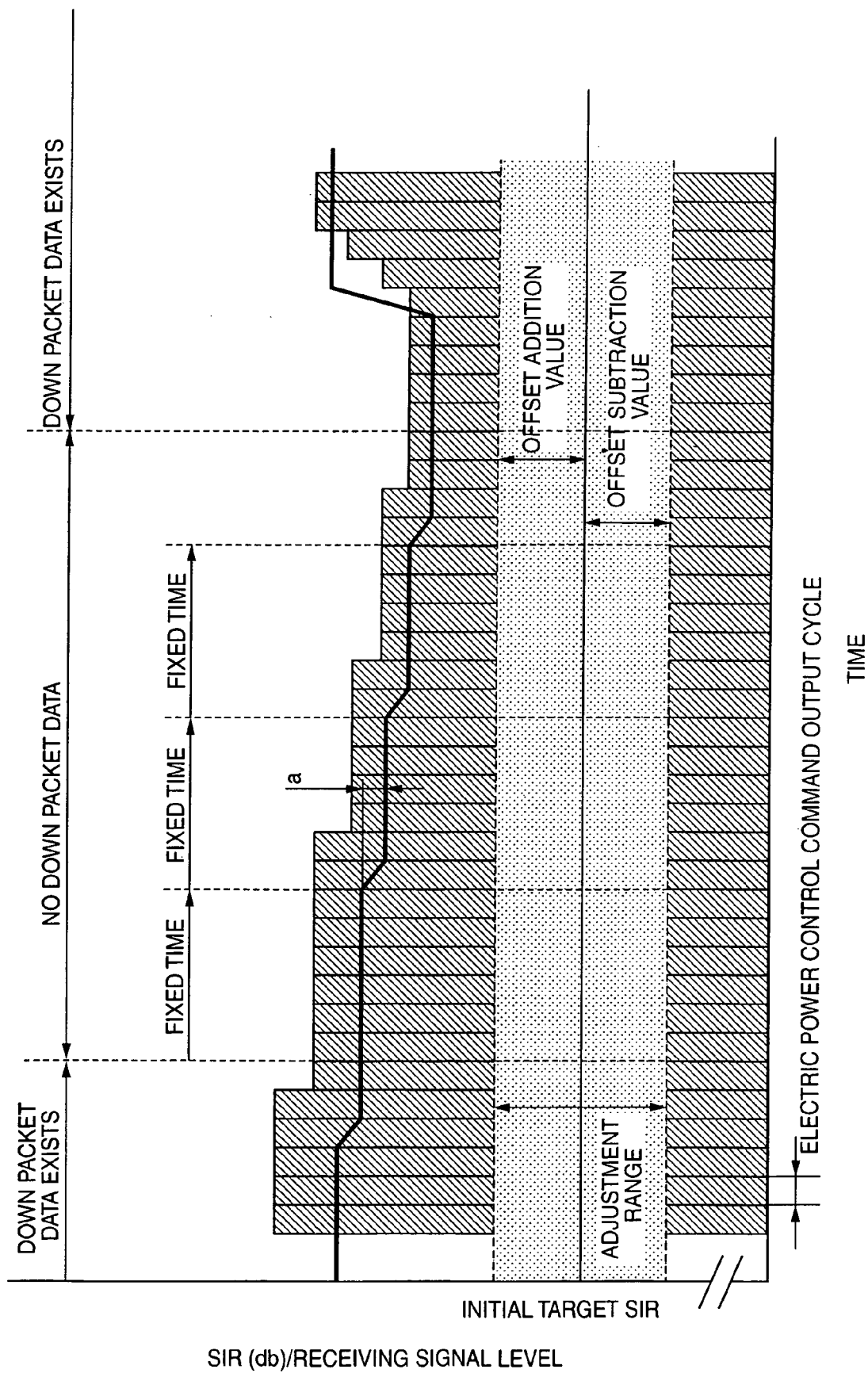
FIG. 7 is a block diagram to show an operating situation of electric power control in a cellular phone device when an output ratio of target signal to disturbance wave becomes beyond a fixed value in a second embodiment related to the cellular phone device according to this invention.
Figure 8:
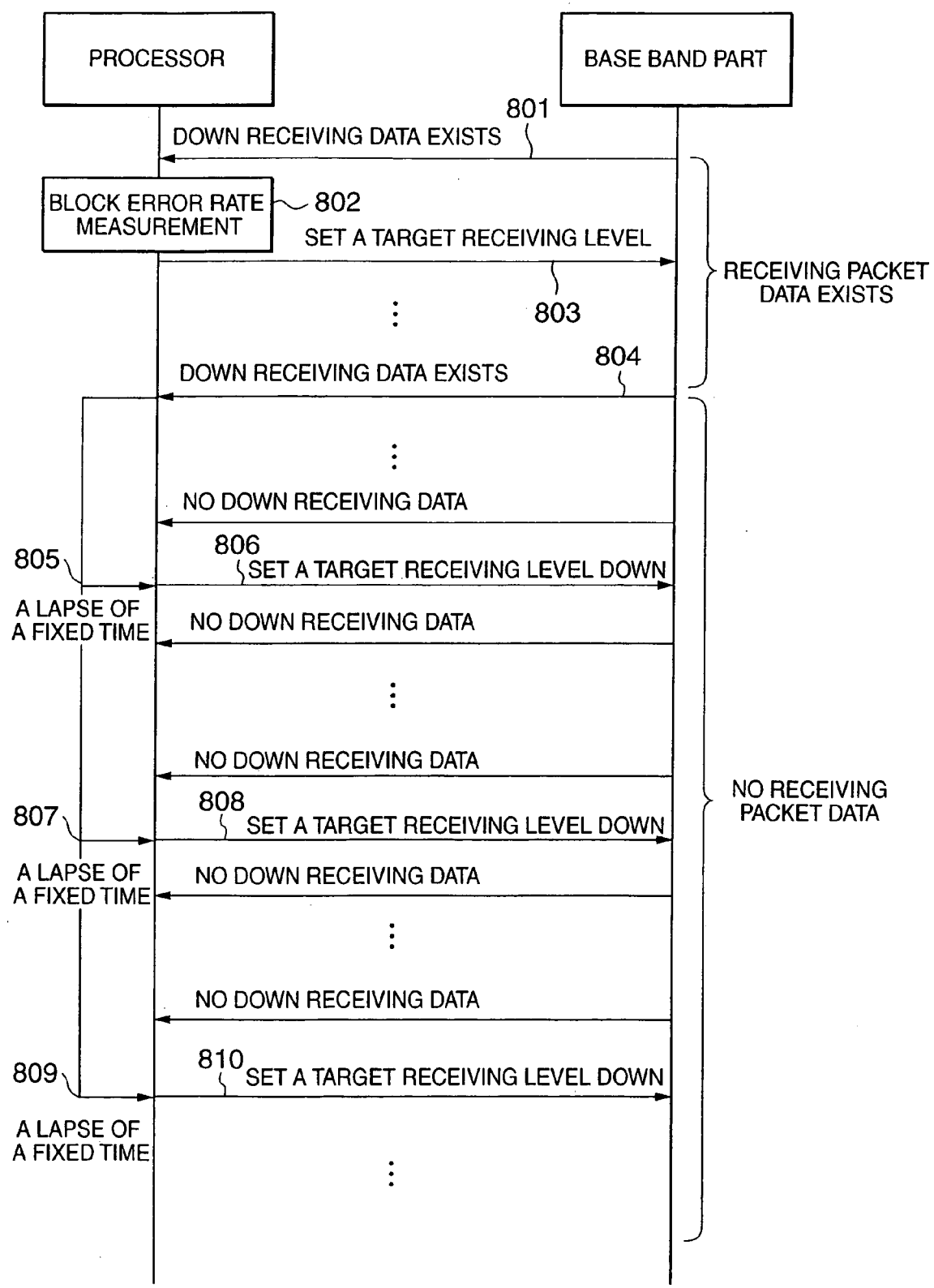
FIG. 8 is a figure to show a processing flow between the processor and the base band part in the second embodiment related to a cellular phone device according to this invention.

Hereinafter, the second embodiment of this invention will be explained referring to FIGS. 1 and 2, and FIGS. 7 and 8, which shows the operations in FIGS. 1 and 2. FIG. 7 shows operations in the case of that a packet does not exist depending on a circuit situation during packet communications and other reasons in the second embodiment of this invention. FIG. 8 is an operation flow to show an example of operations between the processor 4 and the base band part 3 in a cellular phone device in the second embodiment.

The CDMA cellular phone device under packet communications on a dedicated channel in the second embodiment processes receiving data from the radio part 2 with orthogonal code reverse diffusion, radio frame combination, and error correction decoding at the base band part 3. Subsequently, the Viterbi decoder 13 notifies the processor 4 of "downlink receiving data exists" and the receiving data (S801). For base station transmitting electric power control (hereafter, called as outer loop control), the block error rate measurement part 14 in the processor 4 measures a receiving block error rate, and compares with downlink receiving quality to determine target SIR (S802).

Then, the processor 4 sets the target SIR into the target SIR measurement part 15 in the base band part 3 (S803).

The SIR measurement device 11 in the base band part 3 measures a receiving signal level using receiving data from the radio part 2, and derives receiving SIR based on the measured receiving signal level. The SIR comparator 16 compares the acquired receiving SIR with target SIR. With this result, the transmitting electric power control command determination part 17 generates a transmitting power control bit to perform base station transmitting electric power, and maps it onto a physical channel to transmit it.

If downlink packet data does not exist, the Viterbi decoder 13 in the base band part 3 notifies the processor 4 of "no downlink receiving data" (S804). After this, if the state that downlink receiving data does not exist continues for a fixed time (S805), the processor 4 sets a level-downed value from the current SIR into the target SIR setting part 15 in the base band part 3 (S806).

After a next fixed time passes after the target SIR is level-downed (S807), if the target SIR does not exist within the adjustment range yet, the processor 4 resets the target SIR into the target SIR setting part 15 in the base band part 3 so as to be more level-downed (S808). At this point, it is a design matter whether a specific value for target SIR is set or the difference of how much target SIR to adjust is set, and a concrete adjustment method is not especially asked.

Until the target SIR goes into the adjustment range, the level-up/down is repeated (S809 to 810). By measuring electric power at the control part of a physical channel, the base band part 3 can measure receiving electric power. To perform base station transmitting electric power control for target SIR, a transmitting power control bit is generated so that receiving SIR is equal to an initial target SIR set by the processor 4, and mapped onto a physical channel to be transmitted.

If downlink packet data occurs, operations at steps S801 to 803 are repeated to perform the outer loop control based on the target SIR at this point.

With the above-described method, if the state that downlink packet data does not exist continues, target SIR is set so as to be within a range determined by the maximum/minimum value of the adjustment range.

In the above-description, description of FIG. 3 in the first embodiment is made to correspond to that of the second embodiment. Similarly, it is also possible for FIG. 4 in the first embodiment to level-up receiving SIR whenever a fixed time passes.

In the above-described first and second embodiments, a fixed time until target SIR is modified, and offset addition/subtraction values are fixed. In addition, in the second embodiment, a value, which is added or subtracted to or from target SIR after a fixed time passes, is also fixed. However, if the time for modifying target SIR is compulsorily made the same in the state of calling while moving at a high speed (i.e., under bullet-train entrainment) and in a stillness (i.e., under a stop), a block error rate may be degraded in either case.

To solve this problem, parameters related to this invention are changed depending on moving speed of a CDMA cellular phone device, which is measured at the speed measurement part 7 in FIG. 1.

As parameters reflecting situations of a CDMA cellular phone device, there are 1) a fixed time until target SIR is modified, 2) offset addition value, 3) offset subtraction value, 4) subtraction value after a fixed time passes (the value a in FIG. 7), and 5) addition value after a fixed time passes. In addition, 6) modifying value for initial target SIR may also be provided to set target SIR depending on the state of a terminal device.

As a third and fourth embodiments, with reference to FIGS. 9 and 10, it will be described how "1) a fixed time until target SIR" is made to change for what purpose.

Figure 9:
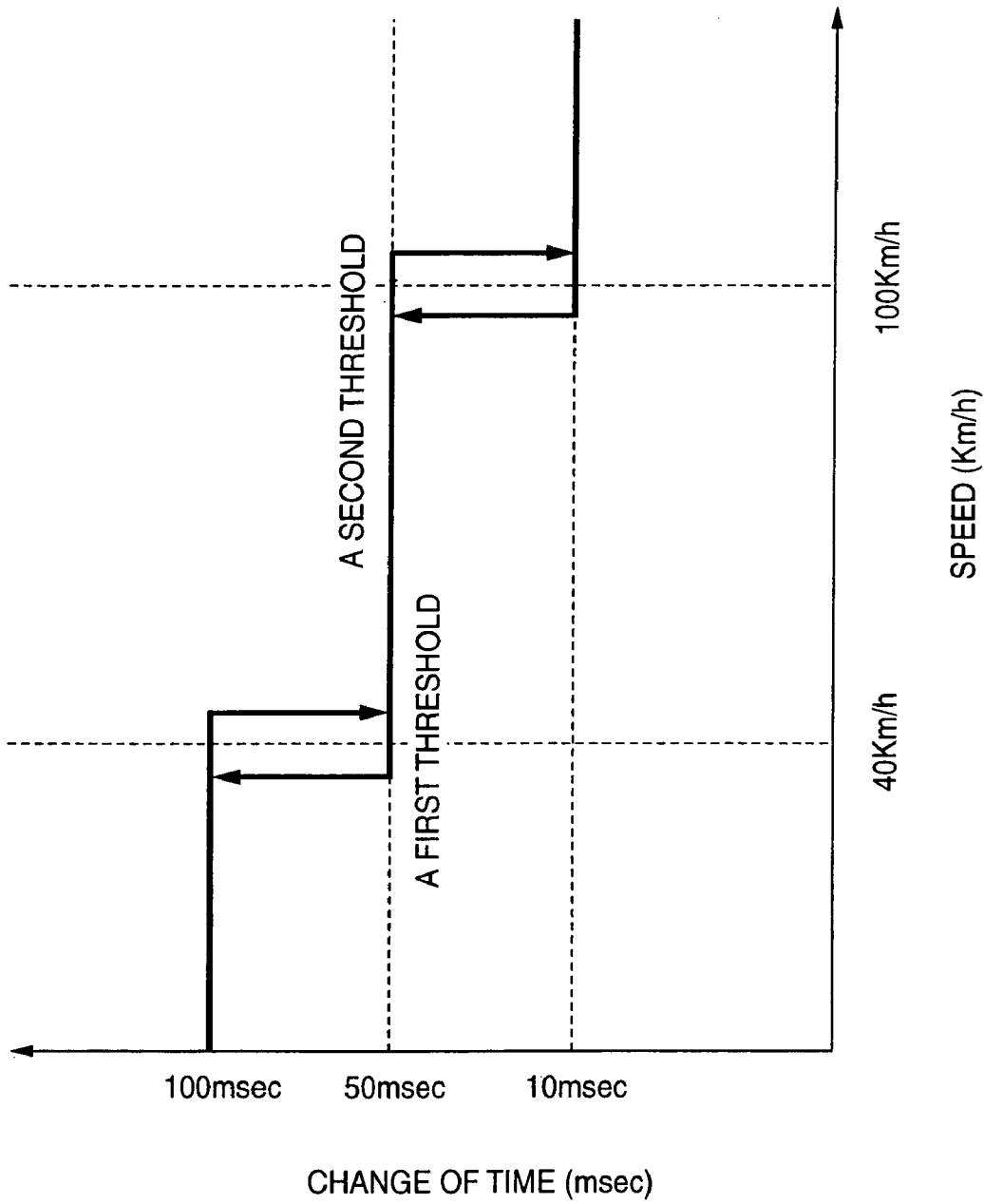
FIG. 9 is a figure to show an example of change of time until target SIR is adjusted in resource opening at a base station as a function of speed of a cellular phone device.

In the third embodiment, FIG. 9 shows the change of a fixed time to a threshold of moving speed in the case of that resource opening of a base station is a chief aim. It is assumed that a phasing change on a transmission way is little in the state of a stop and the state of objects, such as a shelter, is not changed. A change of target SIR is defined as that of after 100 msec (the value of a fixed time in FIGS. 3 to 8) so that the current status can be maintained. Subsequently, movement is started by a vehicle, and the processor 4 defines fixed time as after 50 msec (a first value) if a moving speed measured by the speed measurement part 7 exceeds a first threshold (40Km/h in this figure). This prevents base station resources from being unnecessarily used although a block error rate becomes worse. Furthermore, if the moving speed exceeds a second threshold (more than 100Km/h in this figure) by riding on a highway and moving at a high speed, the processor 4 sets fixed time to after 10 msec and performs output adjustment of a base station early as much as possible to effectively use base station resources.

Figure 10:
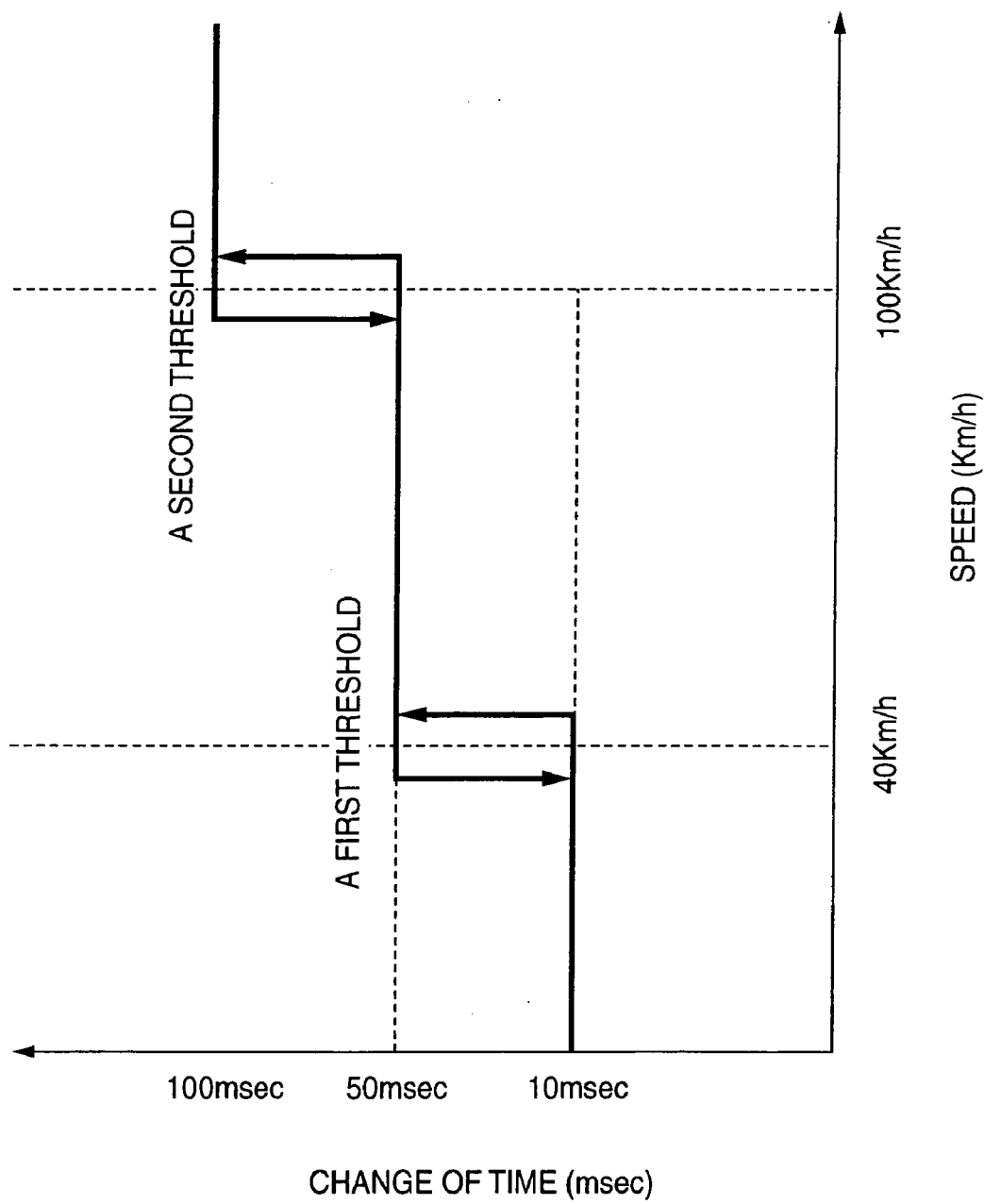
FIG. 10 is a figure to show an example of change of time until target SIR is adjusted in maintaining of a block error rate at a cellular phone device as a function of speed of a cellular phone device.

In the fourth embodiment, FIG. 10 shows the change of a threshold in the case of that, on the contrary, securing a block error rate in the terminal side is a chief aim. In the state of a stop, a block error rate is expected not to be decreased even if reducing some outputs, and the processor 4 sets fixed time to 10 msec. Subsequently, movement is started by a vehicle, and the processor 4 sets the fixed time to 50 msec to prevent the block error rate from decreasing by maintaining output if moving speed of a cellular phone device, which is measured by the speed measurement part 7, exceeds a first threshold (40Km/h in this figure). If the vehicle runs at higher speed and the moving speed of the cellular phone device exceeds a second threshold, the processor 4 sets the fixed time to 100 msec to maintain output and prevent the block error rate from decreasing.

If a speed frequently changes around a threshold speed, immediate switching every reaching the threshold causes switching of an adjustment range to be frequently superfluously performed. Therefore, as shown in FIGS. 9 and 10, the adjustment range is switched after exceeding a threshold more than fixed, so that switching frequency is reduced.

It is a design matter whether either of the two methods or neither is employed, and a person, who implements this invention, should determine it.

As shown in FIG. 7, in the second embodiment, target SIR is decreased by a fixed value whenever a fixed time passes. If 1) a fixed time until target SIR is modified is shortened whenever a speed becomes higher while keeping 4) a subtraction value after a fixed time passes, the subtraction value per time is rapidly increased and a sudden change arises. In order to prevent the rapid expansion of the amount of change, there may also be a method that the processor 4 makes 4) a subtraction value after a fixed time passes correspond to 1) a fixed time until target SIR is modified (correspond to speed), and the subtraction value per time is kept to prevent a rapid change. Similarly, as shown in FIG. 4, it is also possible that 5) an addition value after a fixed time passes is adjusted to prevent the addition value per time from be rapidly increased if target SIR is less than a minimum value of the adjustment range.

Figure 11:
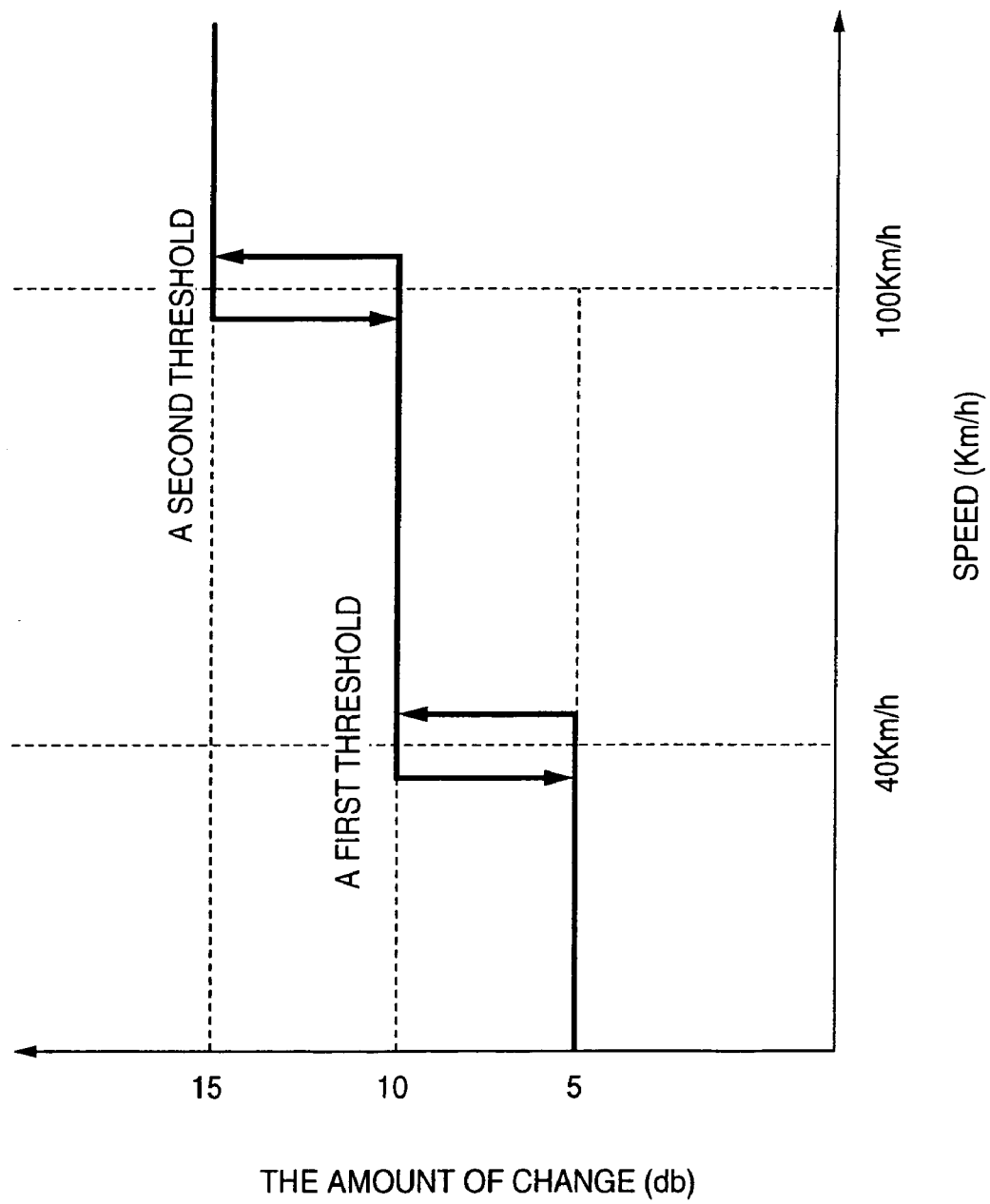
FIG. 11 is a figure to show an example of change of an offset addition value as a function of speed of a cellular phone device.
Figure 12:
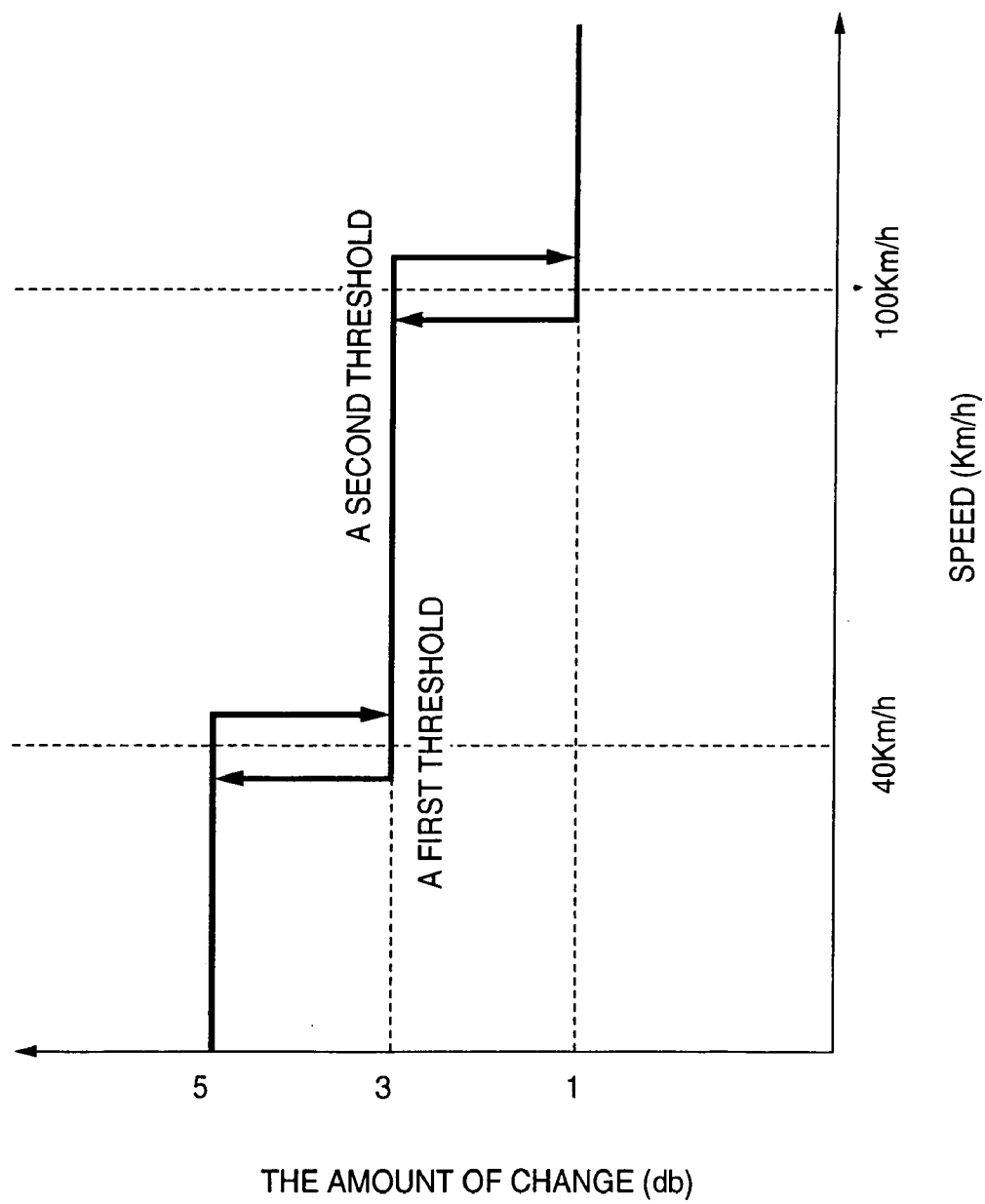
FIG. 12 is a figure to show an example of change of an offset subtraction value as a function of speed of a cellular phone device.
Figure 13:
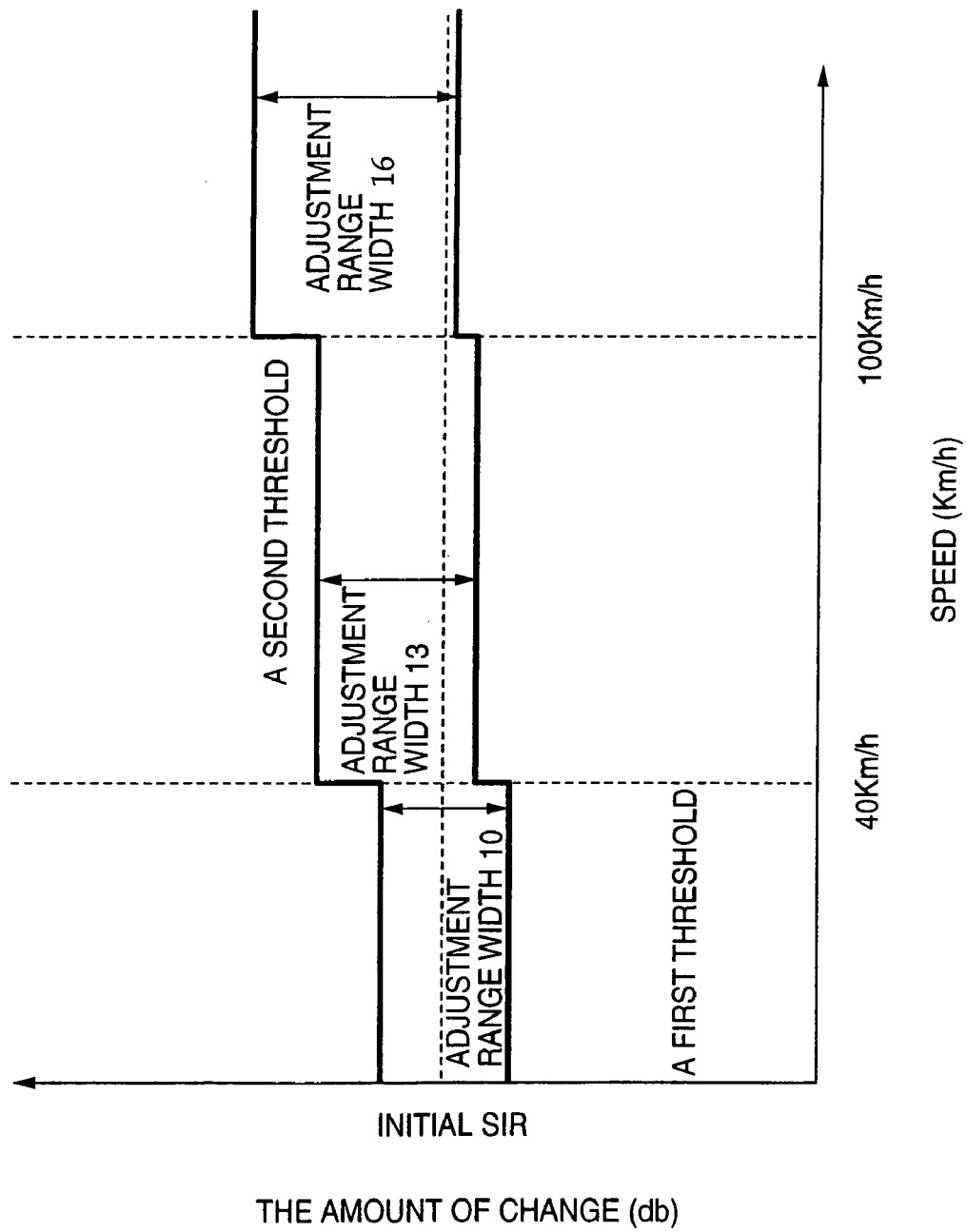
FIG. 13 is a figure to show an example of change of an un-changed section generated by offset addition and subtraction values depending on the changes shown in FIGS. 11 and 12.

FIGS. 11 to 13, which illustrate how 2) an offset addition value and 3) an offset subtraction value are changed, show a fifth embodiment. FIG. 11 shows how an offset addition value changes as a function of moving speed, and FIG. 12 shows the change of a subtraction value as a function of moving speed. FIG. 13 shows how the adjustment range itself changes with the offset addition and subtraction values in FIGS. 11 and 12.

In the state of a stop, an offset addition value is made the same as 3) an offset subtraction value (the value 5 in FIGS. 11 and 12), and the adjustment range is set at 10. If the moving speed of a cellular phone device exceeds 40Km/h and a first threshold, the offset addition value is changed to 10 in FIG. 11 and the offset subtraction value to 3 in FIG. 12. With this change, the width of the adjustment range itself shown in FIG. 13 becomes 13. This maintains a signal output value from a base station highly and extends the range in which output adjustment according to this invention is not performed. This is for the possibility of aggravation of a block error rate to arise if the possibility of environmental change on a transmission way increases and compulsory adjustment is performed against it. At the same time, even if receiving SIR is given to output adjustment according to this invention at or below a minimum value of the adjustment range, the minimum value of the adjustment range in this state is greater 2 than that in the state of a stop. Therefore, this allows the output to be increased to help improve BLER. Furthermore, if moving speed of a cellular phone device exceeds 100Km/h and a second threshold, the offset addition value in FIG. 11 and the offset subtraction value in FIG. 12 change to 15 and 1 respectively. As a result, the width of the adjustment range is extended to 16, and the range where output adjustment is not performed is increased. In addition, the minimum value of the adjustment range is increased, so that a signal output value from a base station can be highly maintained on the whole.

Figure 14:
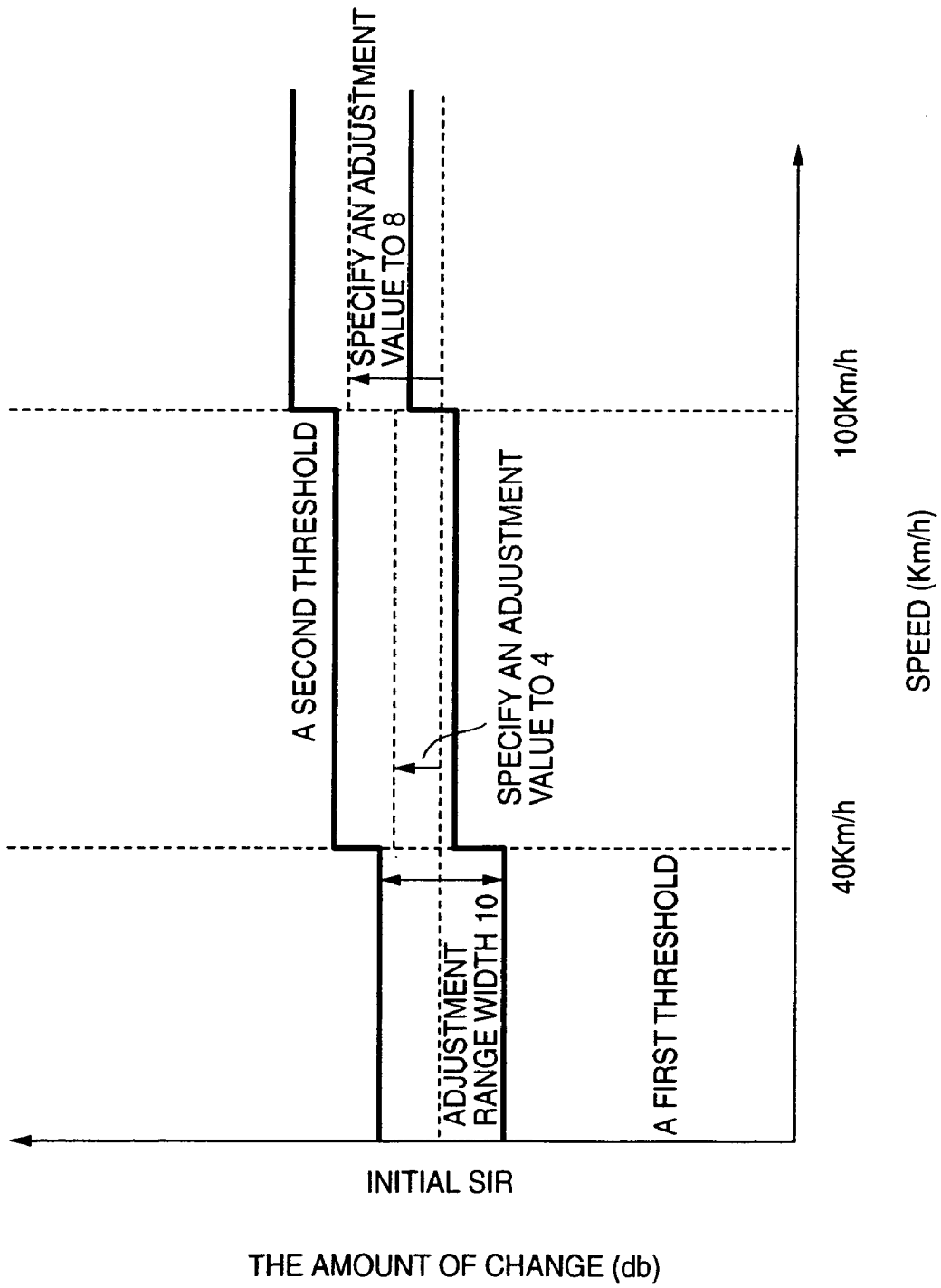
FIG. 14 is a figure to show change of an adjustment range as a function of speed in the case of that initial target SIR, which is referred in determining the adjustment range, is defined with an adjustment value that changes with the speed.

In FIG. 14, with the same method, 6) an initial target SIR is set to a value to adjust depending on speed, and the initial target SIR, which is the reference to determine the adjustment range, is changed whenever exceeding a threshold. When exceeding a first threshold, the adjustment range is defined using the sum of the initial target SIR, which is the reference to determine the adjustment range, and 4; an offset addition value: and an offset subtraction value (in this figure, it is fixed as 5). When exceeding a second threshold, adding the initial target SIR and 8 causes the value of target SIR to be higher when moving at a high speed.

The unit of signal disturbance wave output ratio is db (decibel). If signal output and disturbance output is 1:1, the unit system, which is expressed with the logarithm that takes 0, is employed. In the above description, especially in the fifth embodiment, adjustment with this logarithm is incorporated. In addition, the unit is omitted in receiving SIR and target SIR in description of the specifications.

In addition, if packet data receiving is performed, data terminals other than telephone are also assumed.

Furthermore, the blocks, which are included in the outer loop 12 shown in FIG. 2, are not necessarily included in the base band 3, and it is also possible to process each block in software by the processor 4.

The following effects are acquired by this invention.

As the first effect, as a result of a CDMA cellular phone device's adjusting base station transmitting electric power due to worse radio environment during packet communications on a dedicated channel, if receiving SIR is higher than an adjustment range maximum value, the base station transmitting electric power is decreased and available resources of the base station is increased in the state of no downlink packet data. At the same time, aggravation of a receiving block error rate can be reduced when downlink packet data occurs.

The reason is that, in this invention, by setting target SIR to an adjustment range maximum value and decreasing the receiving signal level of a mobile device after a fixed time passes after downlink packet data does not exist, transmitting electric power of the base station is decreased and available resources of the base station is increased.

In addition, by setting target SIR higher an offset additional value than initial target SIR, base station transmitting electric power is increased when downlink packet data occurs and aggravation of a receiving block error rate is prevented.

As the second effect, as a result of a CDMA cellular phone device's adjusting base station transmitting electric power in a good radio environment during packet communications on a dedicated channel, if receiving SIR is lower than an adjustment range minimum value, the block error rate at time of occurrence of packet data from the state of no downlink packet data is not aggravated and available resource of the base station is increased.

The reason is that, in this invention, by setting target SIR to an offset subtraction from the value of initial target SIR, increasing transmitting electric power of the base station, and increasing transmitting electric power of the base station when packet data occurs, aggravation of a receiving block error rate can be prevented. In addition, by setting target SIR lower an offset subtraction value than the initial value and reducing the receiving signal level of a mobile device, transmitting electric power of the base station is reduced and available resources of the base station is increased.

What is claimed is:

1. A mobile radio apparatus, which executes transmitting electric power control, comprising:
   a receiving circuit for receiving packet data;
   an allowable range setting circuit for setting an allowable range of an output ratio of target signal to disturbance wave, the allowable range setting circuit setting maximum and minimum values of the allowable range based on the value of an output ratio of initial target signal to disturbance wave;
   a packet data detecting circuit for detecting existence of packet data during receiving the packet data, wherein the packet data detecting circuit detects existence of packet data in a fixed cycle; and
   a speed detecting circuit, wherein the allowable range setting circuit changes the allowable range according to a detecting result of the speed detecting circuit, wherein if the value of an output ratio is of initial target signal to disturbance wave is less that the minimum value of the allowable range, a target value of the output ratio of initial target signal to disturbance wave is set to the minimum value of the allowable range.

2. The mobile radio apparatus according to claim 1, wherein if the value of an output ratio of initial target signal to disturbance wave is more than the maximum value of the allowable range, a target value of the output ratio of initial target signal to disturbance wave is set to the maximum value of the allowable range.

3. A mobile radio apparatus, which executes transmitting electric power control, comprising:
   a receiving circuit for receiving packet data;
   an allowable range setting circuit for setting an allowable range of an output ratio of target signal to disturbance wave, the allowable range setting circuit setting maximum and minimum values of the allowable range based on the value of an output ratio of initial target signal to disturbance wave;
   a packet data detecting circuit for detecting existence of packet data during receiving the packet data, wherein the packet data detecting circuit detects existence of packet data in a fixed cycle; and
   a speed detecting circuit, wherein the fixed cycle is changed according to a detecting result of the speed detecting circuit, wherein if the value of an output ratio of initial target signal to disturbance wave is less that the minimum value of the allowable range, a target value of the output ratio of initial target signal to disturbance wave is set to the minimum value of the allowable range.

4. The mobile radio apparatus according to claim 3, wherein if the value of an output ratio of initial target signal to disturbance wave is more than the maximum value of the allowable range, a target value of the output ratio of initial target signal to disturbance wave is set to the maximum value of the allowable range.

5. A mobile radio apparatus, which executes transmitting electric power control, comprising:
   receiving circuit for receiving packet data;
   allowable range setting circuit for setting an allowable range of an output ratio of target signal to disturbance wave, the allowable range setting circuit setting maximum and minimum values of the allowable range based on the value of an output ratio of initial target signal to disturbance wave;
   packet data detecting circuit for detecting existence of packet data during receiving the packet data, wherein the packet data detecting circuit detects existence of packet data in a fixed cycle; and
   speed detecting circuit, wherein the output ratio of initial target signal to disturbance wave, which is used as a reference, is added or subtracted with an adjustment value according to a detecting result of the speed detecting circuit wherein if the value of an output ratio of initial target signal to disturbance wave is less that the minimum value of the allowable range, a target value of the output ratio of initial target signal to disturbance wave is set to the minimum value of the allowable range.

6. The mobile radio apparatus according to claim 5, wherein if the value of an output ratio of initial target signal to disturbance wave is more than the maximum value of the allowable range, a target value of the output ratio of initial target signal to disturbance wave is set to the maximum value of the allowable range.

7. An electric power control method for a mobile radio apparatus, comprising:

a receiving step of receiving signals from a base station;

an adjustment range setting step of setting an adjustment range of an output ratio of target signal to disturbance wave, the adjustment range setting step setting maximum and minimum values of the adjustment range based on the value of an output ratio of initial target signal to disturbance wave a detecting step of detecting the output ratio of receiving signal to disturbance wave related to signals from the base station;

a determining step of determining whether the output ratio of receiving signal to disturbance wave is within the adjustment range if data is not included in signals from the base station;

a command step of issuing a command to allow the output ratio of receiving signal to disturbance wave to enter in the adjustment range if the determining step determines that the output ratio of receiving signal to disturbance wave is not within the adjustment range, wherein if the value of an output ratio of initial target signal to disturbance wave is less that the minimum value of the adjustment range, a target value of the output ratio of initial target signal to disturbance wave is set to the minimum value of the adjustment range; and a speed detecting step of determining moving speed of a mobile radio apparatus, wherein an adjustment range is adjusted at the adjustment range setting step according to a decision of the speed detecting step.

8. The electric power control method according to claim 7, wherein if the value of an output ratio of initial target signal to disturbance wave is more than the maximum value of the adjustment range, a command, which sets a target value of the output ratio of initial target signal to disturbance wave to be the maximum value of the adjustment range, is issued at the command step.

* * * * *